United States Patent
Burg et al.

(10) Patent No.: US 6,477,247 B1
(45) Date of Patent: *Nov. 5, 2002

(54) APPARATUS AND METHOD FOR DIALING OUT OF LOCAL AREA TELEPHONE CALLS

(75) Inventors: Frederick Murray Burg, West Long Branch; Howard Paul Katseff, Englishtown; Bethany Scott Robinson, Lebanon, all of NJ (US)

(73) Assignee: AT&T Corp., New York, NY (US)

( * ) Notice: Subject to any disclaimer, the term of this patent is extended or adjusted under 35 U.S.C. 154(b) by 117 days.

This patent is subject to a terminal disclaimer.

(21) Appl. No.: 09/631,693

(22) Filed: Aug. 3, 2000

Related U.S. Application Data (63) Continuation of application No. 08/884,206, filed on Jun. 27, 1997, now Pat. No. 6,134,319.

(51) Int. Cl.⁷ .............................................. H04M 3/42
(52) U.S. Cl. ................ 379/354; 379/88.03; 379/213.01
(58) Field of Search ........................... 379/67.1, 88.01, 379/88.03, 201.01, 213.01, 218.01, 218.02, 354, 355.04, 355.05, 355.06, 355.08, 355.09; 704/270, 275

(56) References Cited

U.S. PATENT DOCUMENTS

| | | | |
|---|---|---|---|
| 5,259,026 A | 11/1993 | Johnson | 379/207 |
| 5,483,586 A | 1/1996 | Sussman | 379/201 |
| 5,619,555 A | 4/1997 | Fenton et al. | 379/67 |
| 5,644,625 A | 7/1997 | Solot | 379/88 |
| 5,732,132 A | 3/1998 | Hamada | 379/354 |
| 5,764,731 A | 6/1998 | Yablon | 379/88 |
| 5,850,433 A | 12/1998 | Rondeau | 379/201 |
| 5,859,901 A | 1/1999 | Brendzel et al. | 379/114 |
| 5,887,056 A | 3/1999 | Sonnenberg | 379/220 |
| 5,917,904 A | 6/1999 | Theis | 379/355 |

Primary Examiner—Scott L. Weaver (57) ABSTRACT

An apparatus and method is provided for placing a phone call when dialing out of the caller's local area. A database resident in a telephone connection mechanism contains the access codes required to place the out-of-local area call. A user input device is utilized by the calling party to retrieve the out-of-area access codes for the called party's telephone from the database. The user input device is also utilized by the calling party to input the called party's local telephone number into the telephone connection mechanism. The telephone connection mechanism automatically combines the local calling number input by the user with the out-of-area access codes retrieved from the database. The telephone connection mechanism then transmits a telephone connection request by utilizing the combined local telephone number and the out-of-area access codes. The present invention also verifies out-of-area access codes that are directly input by the calling party to ensure their accuracy and corrects any incorrect access codes input by the caller.

32 Claims, 6 Drawing Sheets

APPARATUS AND METHOD FOR DIALING OUT OF LOCAL AREA TELEPHONE CALLS

This application is a continuation of application Ser. No. 08/884,206, filed Jun. 27, 1997 now U.S. Pat. No. 6,134,319.

BACKGROUND OF THE INVENTION

The present invention relates to an apparatus and method for dialing out-of-local-area telephone calls. ore specifically, the invention provides for allowing a calling party to retrieve out-of-area access codes for a called party's telephone number from a database and automatically calling the called party by utilizing the retrieved access codes and the called party's local telephone number that is input by the caller.

In calling a party that is located out of the calling party's local area, access codes must be utilized to direct the call to the called party. These access codes may be the called party's area code if calling intra-nationally (e.g. within the United States) or may be international calling codes, country codes, and city codes if dialing internationally. In either situation, access codes are required to place the phone call.

The requirement for the caller to remember, or know, these access codes when placing a call is a drawback that can make placing an out-of-area phone call burdensome. As stated previously, for calls within the United States, the called party's area code must be known. In the United States today many geographic areas suffer from shortages of local telephone numbers. To remedy the situation, additional area codes are being utilized in those locations. This results in established local phone numbers being assigned new area codes. It is difficult for an out-of-area calling party to remain aware of the particular area code that may be assigned to a local telephone number. When dialing internationally, it is often difficult to determine what particular access codes are required to place a call to the called party. For example, if dialing long distance within England, a "0" must be added to the local telephone number to place the call, however, if dialing that same number from a location outside of England, i.e. internationally, the "0" must be replaced with "44". Thus, even where out-of-area information is known for a particular called party's phone number, the information that is known may not be correct for placing the call from that particular calling party's geographic location.

Presently, it is possible to obtain assistance in placing an out-of-area call, however, current methods present drawbacks. For example, a calling party is currently able to obtain operator assistance in placing an out-of-area phone call. However, the use of an operator may require additional expense and results in an inconvenience for a calling party by having to utilize a third party in placing a call. A calling party may also obtain assistance in placing a call by looking up the required access codes in a directory, however, this requires the availability of a directory and additional time for looking up the codes. An additional drawback with utilizing a directory, e.g a telephone book, is that directories can quickly become out of date.

Currently, directories are available on the Internet. The shortcoming of this resource is that the current systems are text-based which require that the caller type in the country and city names for which access codes are desired. Incorrect spelling of the locations by the caller can be a problem that will inhibit the caller from obtaining the desired access codes. Additionally, even if the access codes are obtained by the caller, the caller must manually input the obtained access codes when placing a call, e.g. by dialing on the phone keypad or on a computer keyboard, which again can lead to input error and delays when placing a call.

An additional drawback with the current systems is that if an incorrect access code is obtained by the caller and then utilized to attempt to call an out-of-area party, the call will not be completed and no assistance will be provided to the calling party for correcting the error. The current systems cannot correct an incorrectly entered access code. An example of this situation is the call to a city in England, mentioned previously, where "0" is the correct access code for an intra-country long distance call but is an incorrect code for an international long distance call. If an internationally calling party incorrectly dials "0" to place the call, the calling party's error will not be automatically corrected by any of the currently known methods for assisting long distance dialing.

Therefore, it would be desirable to provide an apparatus and method for allowing a caller to easily retrieve access codes for placing an out-of-area phone call, for automatically combining the retrieved access codes with the local telephone number input by the caller to place the out-of-area telephone call, and for correcting any incorrect access codes that may be input by the caller.

SUMMARY OF THE INVENTION

An apparatus and method is provided for placing a phone call when dialing out of the caller's local area. A database resident in a telephone connection mechanism contains access codes. The codes that are contained in the database are those that are required to place a call to the called number when the caller is calling from a location outside of the called number's local area. For example, if calling intra-nationally, these codes could be the called party's area code or, if calling internationally, they could be the international access codes and country codes required for the called number.

A user input device is utilized to input the called party's local telephone number (e.g. in the United States, the local telephone number would be the seven digit telephone number) into the telephone connection mechanism. The user input device is also utilized to retrieve the out-of-area access codes for the called party's telephone number that are stored in the database. The telephone connection mechanism automatically combines the called party's local telephone number and the accessed out-of-area access codes and transmits a telephone call connection request by utilizing the combined telephone number for the called party.

With the present invention the calling party is also able to input the complete phone number of the called party, i.e. the local number and all required access codes. When utilized in this manner, the present invention verifies the out-of-area access codes that are directly input by the calling party to ensure their accuracy and corrects any incorrect access codes that are input by the caller.

In this manner, an out-of-area phone call can be easily placed by a caller. The local calling number input by the user is automatically combined with the out-of-area access codes retrieved from the database by the telephone connection mechanism. The telephone connection mechanism transmits a telephone call connection request by utilizing the combined local telephone number and the out-of-area access codes.

DETAILED DESCRIPTION

Figure 1:
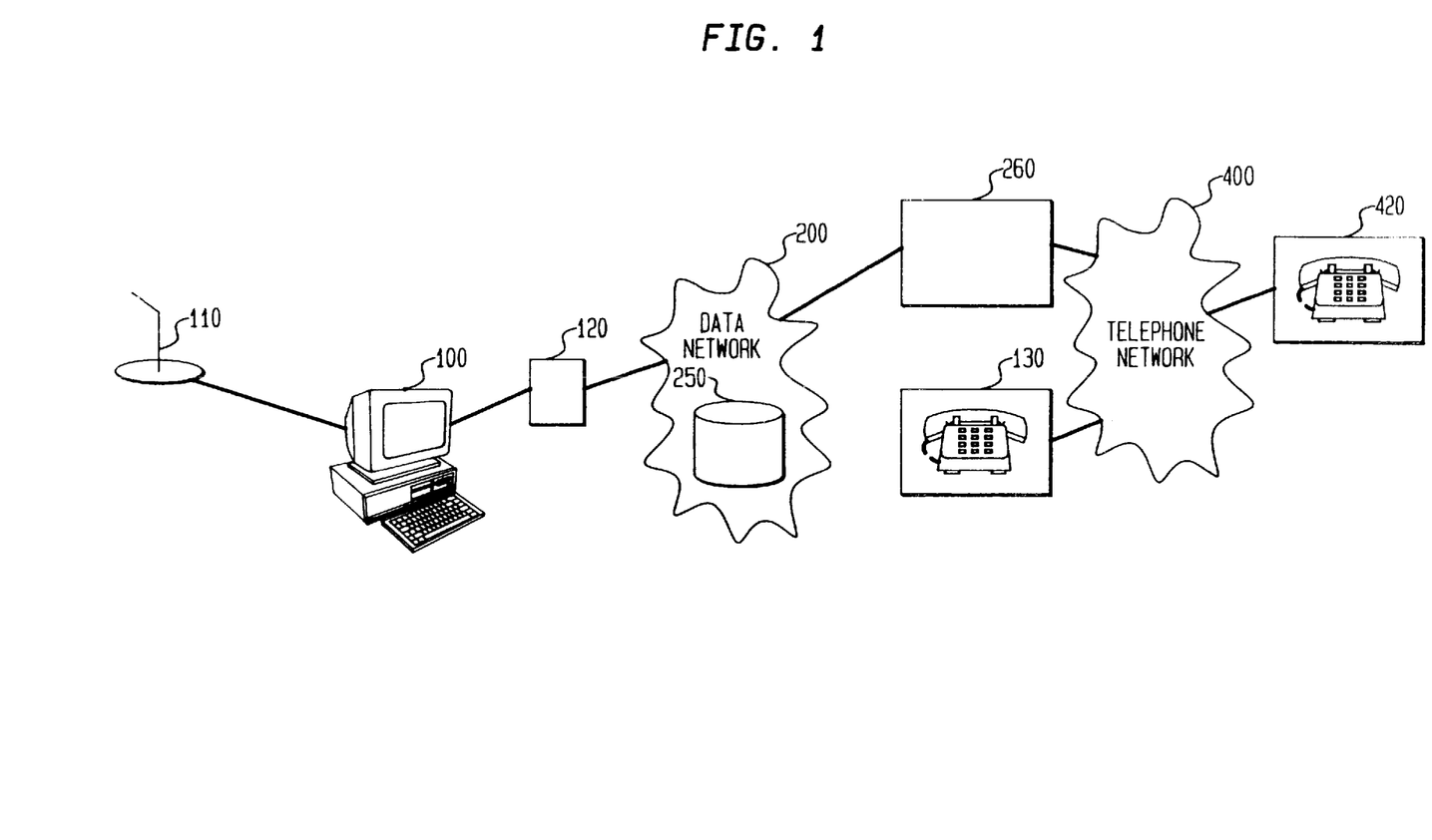
FIG. 1 illustrates one embodiment of a system for placing an out-of-area telephone call utilizing the present invention.

FIG. 1 illustrates an embodiment of a system for placing an out-of-area telephone call that utilizes the present invention. FIG. 1 illustrates the embodiment where a phone call is placed by a calling party to an out-of-local-area called party by inputting data to, and retrieving data from, a telephone connection mechanism, which in this embodiment is a data network, and by providing this data to a telephone network to place the call to the called party. The discussion below related to connection of a user computer and a user telephone to a telephone network via a data network is known in the art and is but one embodiment of a communication system in which the present invention may be practiced.

The general sequence of events for placing an out-of-area phone call by utilizing the present invention in the context of a data network, as illustrated in FIG. 1, is described below. Data network 200, may be any network capable of processing data and one example of such a data network is the Internet. To place a phone call to a called-party's phone 420, a caller inputs the called party's local telephone number into data network 200 by utilizing user input device, or personal computer, 100. Personal computer 100 is connected to data network 200 through conventional means, such as by modem 120. After inputting the local telephone number, the calling party retrieves the out-of-area telephone access codes required for placing the call from database 250, which is resident in network 200. The local telephone number input by the caller and the required access codes retrieved from the database are automatically combined by network 200 and transmitted to connection server 260. Connection server 260 requests telephone network 400 to establish a connection between the connection server, and thus the data network, and the called-party's phone 420. After a connection is established between connection server 260 and the called-party's phone 420, the calling party may communicate with the called party through a microphone 110 connected to computer 100 or through the calling party's telephone 130 if an additional connection request is made by connection server 260 to telephone network 400 to establish the connection to the calling party's phone.

Figure 2:
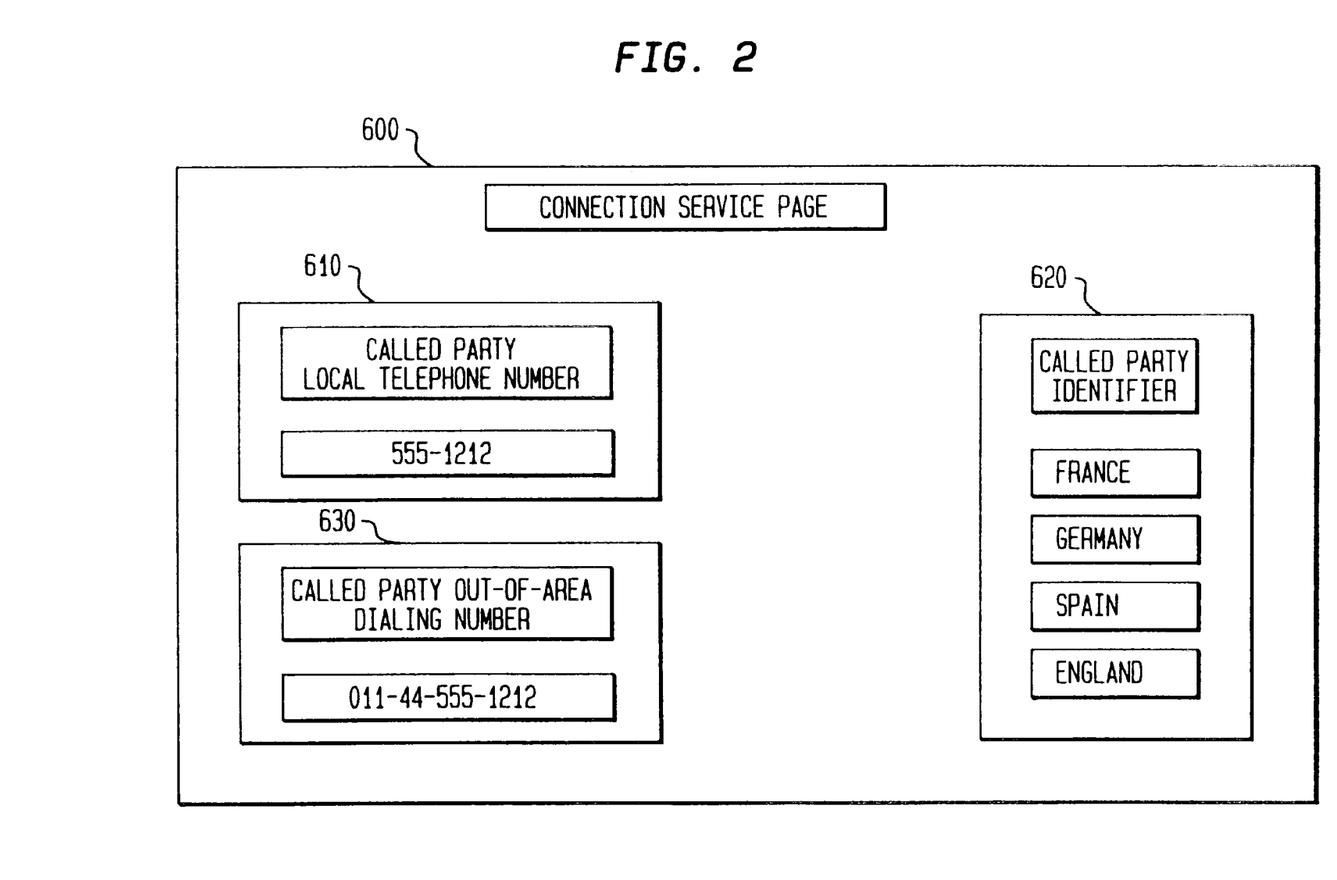
FIG. 2 illustrates one embodiment of a connection service page in accordance with the present invention.

To place the call to the called party by utilizing the present invention, as embodied in the system of FIG. 1, a Connection Service Page 600 is downloaded from data network 200 to the calling party's computer 100. One embodiment for Connection Service Page 600 is illustrated in FIG. 2. Connection Service Page 600 is the means by which the calling party both inputs the local telephone number of the called party into network 200 and retrieves the access codes required from database 250, which is resident in network 200.

As illustrated in FIG. 2, Connection Service Page 600 provides a Called Party's Local Telephone Number data entry field 610, a Called Party Identifier display field 620, and a Called Party Out-Of-Area Dialing Number display field 630. To place an out-of-area phone call by utilizing Connection Service Page 600, the calling party types the called party's local telephone number into the Called Party's Local Telephone Number data entry field 610 using the computer's keyboard. The called party's local telephone number is defined as the minimum number of digits required to call the called party from an external phone in the same local service area, i.e. the local phone number does not include any access codes that are required for calling that party from an area out of the local calling area of the called party (e.g. international access codes, city codes, area codes, etc.). When the calling party inputs the called party's local telephone number in the Called Party's Local Telephone Number data entry field 610, the local telephone number is input into network 200.

To retrieve the called party's out-of-local-area access codes there is provided a Called Party Identifier display field 620. The Called Party Identifier display field 620, in the illustrated embodiment, is a listing of geographic locations. The geographic locations listed in field 620 on Connection Service Page 600 are downloaded from database 250. Associated with each of these geographic locations, there is stored in database 250 the access codes that are required to call a party located in that particular geographic location when calling from outside of the called party's local calling area. For example, if the calling party selected "France" as the geographic location of the called party, the international access codes required for calling the called party in France would be retrieved from database 250. The calling party retrieves the access codes associated with a particular geographic location by selecting a particular location from the list. By retrieving the access codes from the database, the access codes are automatically combined with the called party's local telephone number that was input by the caller in field 610 by network 200. The combined local telephone number and access code is displayed in field 630, which is termed the Called Party Out-Of-Area Dialing Number field. The complete telephone number of the called party, i.e. the local telephone number and any required access codes, is then transmitted by network 200 to connection server 260 to request that connection server 260 establish a call to the called party.

The local telephone number input by the called party and any required access codes accessed from the database are automatically combined by network 200 through software programmed to accomplish this function. The capability to transmit a telephone connection request by a data network to a telephone network is well known in the art.

The calling party may select the particular geographic location from the displayed list in field 620 by any known means. For example, the user could point and click on the geographic location by utilizing a mouse connected to the computer. Alternatively, the user could utilize the function keys on the computer's keyboard to select a particular location. A variety of means for selecting the geographic location could be utilized with the present invention.

Figure 3:
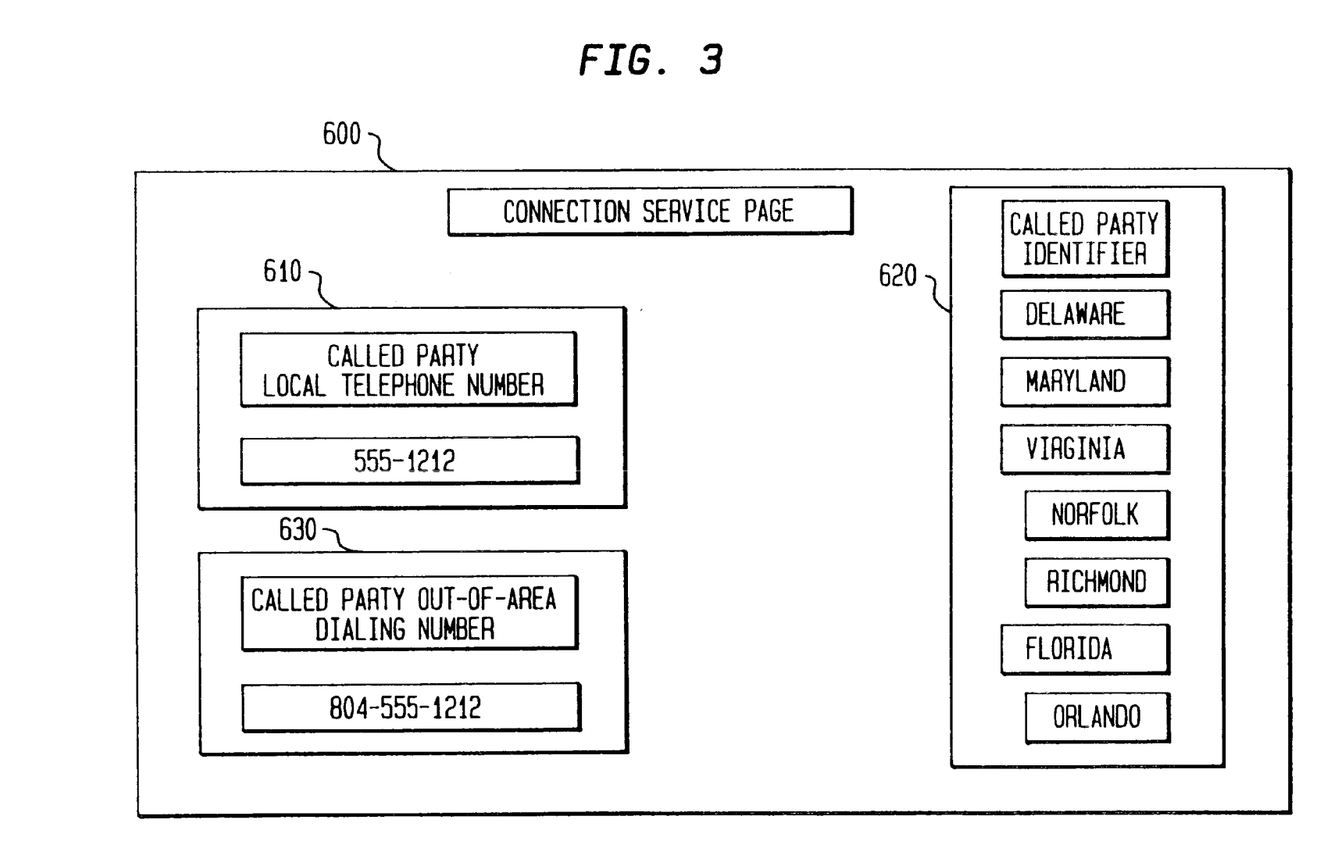
FIG. 3 illustrates a second embodiment of a connection service page in accordance with the present invention.

Additionally, the embodiment illustrated in FIG. 2 shows the geographic locations listed in field 620 as a list of countries, however, the locations listed can be for any geographic territory. For example, as illustrated in FIG. 3, if the calling party desires to place an intra-United States out-of-area phone call, the geographic locations could be listed as States. The listing for each State could be a pull-down menu where, after a particular State is selected, a listing of counties and/or cities within the State could be displayed. The caller would then select the appropriate geographic location where the called party was located such that the relevant access code, which in this example is the area code, would be retrieved from the database and automatically combined with the called party's local telephone number to send a connection request to a telephone network to place a call to the called party. If a long distance indicator of a "1" is required to place the call, in addition to the area code, the software would automatically add this access code as well.

Figure 4:
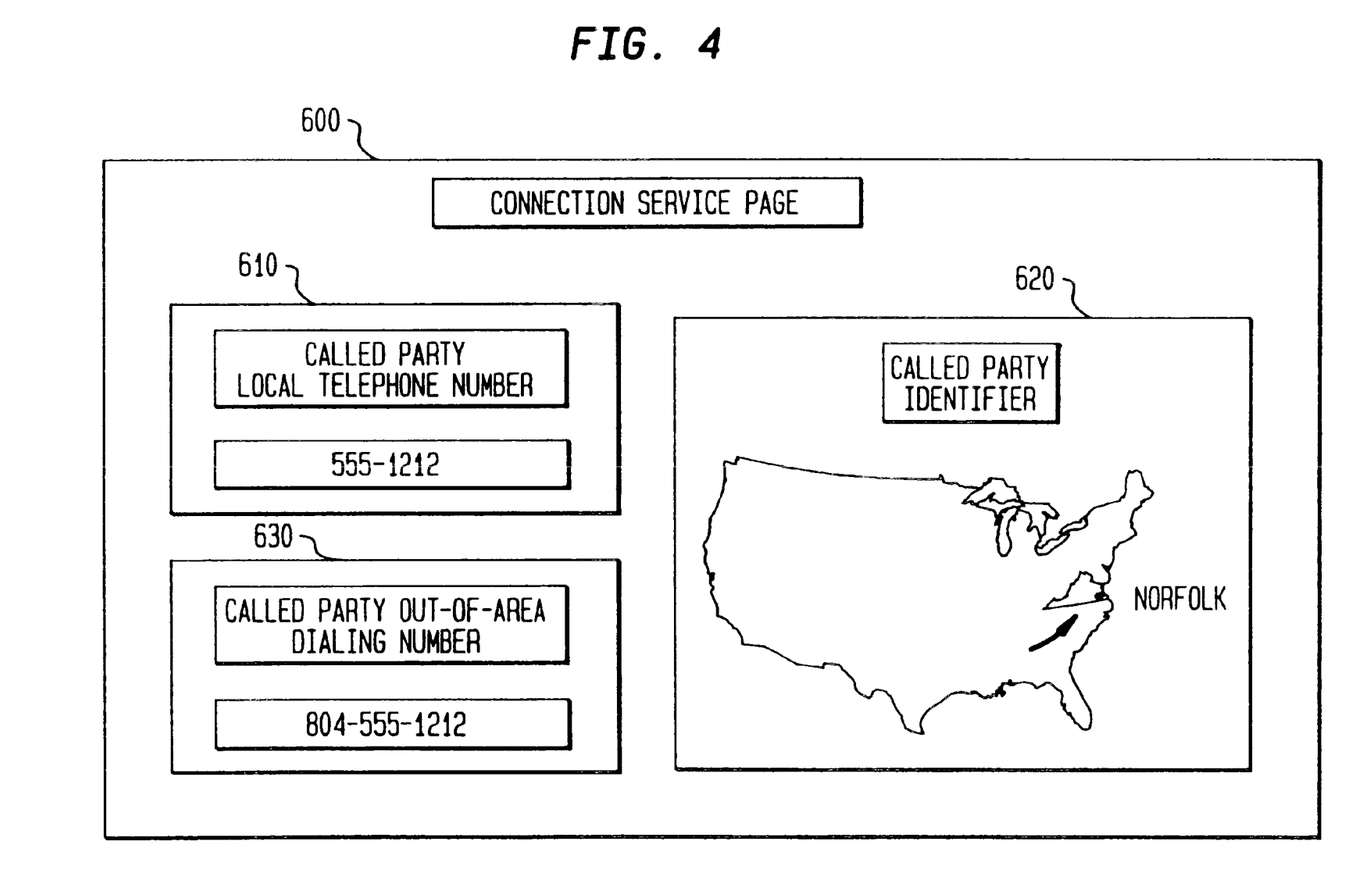
FIG. 4 illustrates a third embodiment of a connection service page in accordance with the present invention.

As shown in FIG. 4, the geographic location listing does not need to be a textual table, but rather, can be a graphical display. In FIG. 4, a map of the United States is displayed. The map could have various states and cities displayed on the map for selection by a caller. Once again, when the caller selected a particular geographic location from the map, the appropriate access codes would be retrieved from the database and automatically combined with the local telephone number of the called party to place the call.

As discussed, whereas FIGS. 2–4 illustrate various formats for Connection Service Page 600, many variations on these examples are possible. Additional display fields and different formats for the display fields are possible without departing from the scope of the invention. More specifically, an alternative embodiment for the Called Party Identifier display field 620 is contemplated. Whereas geographic locations alone have been disclosed for identifying a called party such that the access codes for the called party's telephone number may be obtained, other identifying data could be supplied to the calling party in field 620 for allowing the calling party to obtain the access codes for the called party's telephone number.

The use of other identifying data for retrieving access codes for a particular called party has particular utility where access codes are not assigned to a called party based solely on the geographic location of the called party. For example, in particular States, due to the shortage of area codes, new area codes are being assigned to persons in a geographic location that are different from the areas codes that are currently in existence for that particular geographic location. For example, one person can have an area code of 111 and another person, living just next door, can be assigned a new area code of 222. Therefore, in this situation, identifying a called party by geographic location alone may not provide the correct area code for that called party. In this instance, the present invention would provide additional identifying data for the called party to the calling party in order to obtain the correct access code.

The additional identifying data for the called party that could be provided could be the party's name. For example, if a calling party desires to call a party in Maryland but the calling party does not know the proper access code, i.e. area code, for Maryland and if Maryland uses multiple area codes in particular geographic areas, the Called Party Identifier display field 620 could provide the calling party with the option of selecting Maryland for a geographic location, as previously disclosed. After selecting Maryland, a pull-down menu could provide further options for selecting the particular city in Maryland that the called party resides in. Then, if that particular city has multiple area codes assigned, for example the 111 and 222 area codes referred to above, the calling party could be provided with a list, by name, of all person's with phone numbers that match the called party's local phone number in that particular city and the area codes that have been assigned to those persons. In this manner, additional identification information can be utilized by a calling party to obtain the access codes for a called party.

The identification information described above, where a geographic location and a name were used as identifiers to obtain the access code for a called party, is but one example of alternative identifying information that can be used to obtain access codes for a called party. In a situation where access codes are not based to any extent upon geographic location, it is contemplated that other identification information alone, i.e. independent of geographic identifier information, can be displayed in Called Party Identifier field 620 and utilized by a calling party to retrieve access codes for a called party from the database. This other identifying information can be the called party's name, as described above, or other identifying information.

Regardless of the type of called party identifier information utilized to determine access codes for the called party, the telephone connection mechanism, through the connection service page, will prompt the calling party for identifier information until sufficient information is available to determine the appropriate access code for the called party. For example, if the United States was selected as the country for the called party, the invention can prompt the calling party for the state, and then the county/city, etc. until the proper access code for the called party can be determined.

Figure 5:
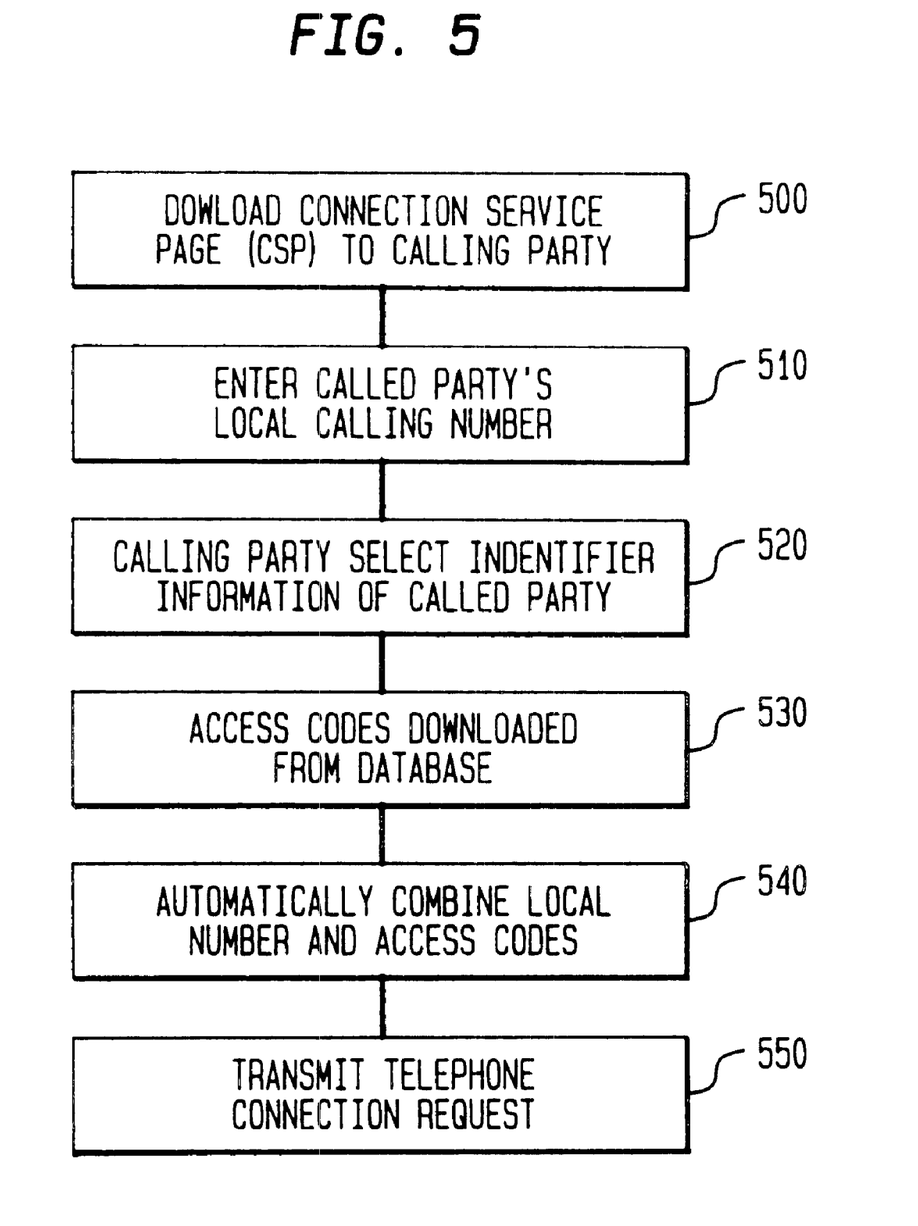
FIG. 5 illustrates the process steps for placing an out-of-area phone call in accordance with the present invention.

The flow of information in practicing the present invention is illustrated in FIG. 5. In step 500, a Connection Service Page (CSP) is downloaded from network 200 to a user's personal computer. The user, or calling party, enters the called party's local calling number into the CSP as shown in step 510. The calling party then selects the identifier information of the called party from a display provided on the CSP in step 520. Step 530 defines the operation where the out-of-area access codes for the called party's phone number are downloaded from the database in response to the calling party's selection of the called party's identifier information. After the access codes are downloaded from the database, the access codes are automatically combined with the local telephone number as shown in step 540. The network 200, or telephone connection mechanism, transmits a telephone connection request to a telephone network by utilizing the called party's telephone number, which is the combination of the local telephone number and the required access codes, step 550.

Figure 6:
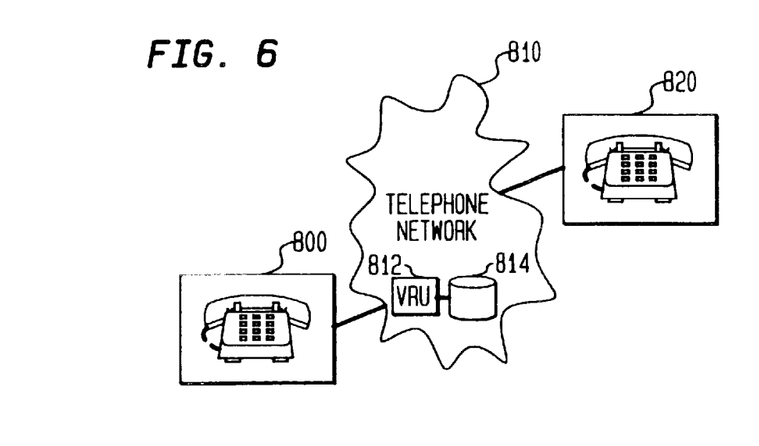
FIG. 6 illustrates a second embodiment of a system for placing an out-of-area telephone call utilizing the present invention.

As stated previously, the embodiment shown in FIG. 1 is but just one communication system in which the present invention may be utilized. It is not required that a personal computer and a data network be utilized with the present invention. Any user input device and telephone connection mechanism can be utilized when practicing the present invention. As shown in FIG. 6, a caller's telephone 800 can be utilized as the user input device and the telephone network 810 itself can be utilized as the telephone connection mechanism. In the embodiment of FIG. 6, the calling party calls into the telephone network by using the caller's telephone 800. Once connected into the telephone network 810, a voice response unit (VRU) 812 prompts the caller to input the local telephone number of the called party into the telephone network. The VRU also provides the calling party with options for selecting the identifier information of the called party, which in this example is again the geographic location of the called party. For example, the VRU could ask the caller if the called party is located in a foreign country. Depending on the response of the calling party, the VRU would ask additional questions until the geographic location was determined. The caller would input their responses to the prompts issued by the VRU by utilizing either the telephone keypad or by providing an oral response to the VRU which is recognized by the VRU though utilization of known speech recognition software. Once the geographic location of the called party was input into the telephone network, the network would retrieve the access codes for the called party from database 814, which is resident in telephone network 810. The network would then automatically combine the retrieved access codes with the local telephone number and place the call to the called party's telephone 820. In this manner, a telephone network and a user's telephone could be utilized to practice the present invention.

Figure 7:
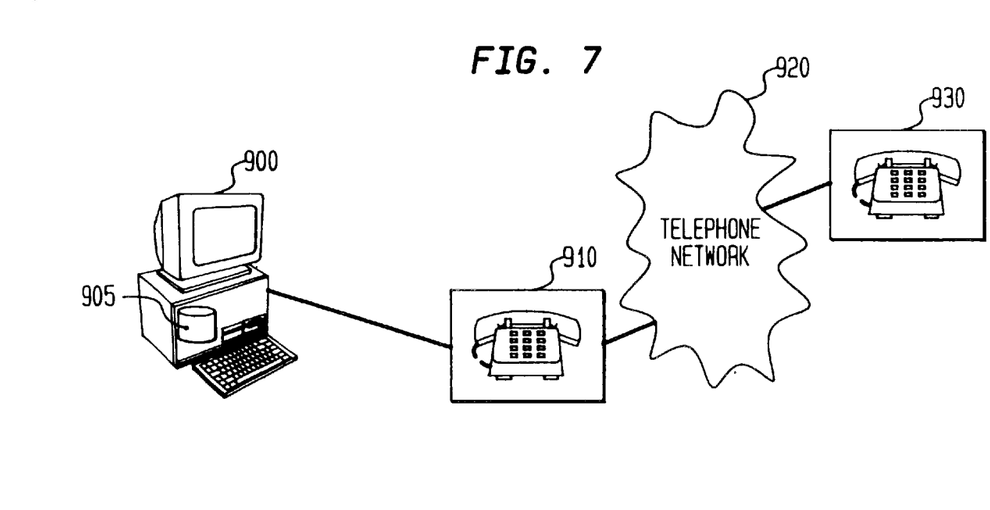
FIG. 7 illustrates a third embodiment of a system for placing an out-of-area telephone call utilizing the present invention.

A third embodiment of a communication system that could be utilized with the present invention is the system as illustrated in FIG. 7. In FIG. 7, it is shown that a caller's personal computer 900 is connected to the caller's phone 910. The caller's phone is in-turn connected to a telephone network 920. The caller's phone 910 is connected to the computer 900 such as by a plug-in PC card (not shown). Within computer 900, which in this embodiment is the telephone connection mechanism, is database 905. Database 905, as disclosed for the alternative embodiments discussed previously, contains access codes for placing an out-of-area phone call to a called party. In operation, the invention as embodied in FIG. 7 performs the same functions as previously disclosed. The Connection Service Pages of FIGS. 2–4 would be displayed on the monitor of the caller's computer. The caller would enter the Called Party Local Telephone Number into field 610 by utilizing the computer's keyboard as the user input device. The caller would select the Called Party Identifier from a list provided in field 620, as downloaded from database 905. The selection of a particular Called Party Identifier would retrieve the associated access codes for that identifier from database 905. As previously disclosed, the local telephone number input by the caller would be automatically combined with the access codes retrieved from the database. The combined phone number would then be utilized by the computer to send a telephone call connection request by dialing telephone 910. Telephone 910 would connect with telephone network 920 to establish a phone connection between the caller's telephone 910 and the called party's telephone 930, as is well known in the art.

Another feature of the present invention, which can be utilized in any embodiment contemplated, is the capability to remove any incorrect access codes that may be directly input by the caller when the caller is inputting the called party's local telephone number. In the disclosed embodiments, the calling party directly inputs only the local phone number of the called party. After selection of a particular identifier by the caller, e.g. the geographic location of the called party, the appropriate access code is automatically combined with the local telephone number and the call is automatically placed to the called party. However, it is contemplated that the present invention is also capable of allowing the caller to input the complete phone number of the called party, i.e. the local phone number and the required access codes, and verifying the access codes input by the caller.

In operation, after inputting the called party's phone number, including any access codes required, the caller selects the identifier information for the called party from the display as disclosed. The access codes in the phone number input by the caller are then checked against the access codes stored in the database for the called party to verify that the correct codes have been input by the caller. If the codes input by the caller match the codes retrieved from the database, the call is automatically placed to the called party. If the access codes that are input by the caller are different from the access codes that are retrieved from the database, the incorrect access codes input by the caller will be deleted from the phone number and the correct access codes that were retrieved from the database will be combined with the local telephone number input by the caller to place the call to the called party.

In order to determine what access code is required for a particular called party, which in-turn depends on where the calling party is calling from, the telephone connection mechanism, e.g. the network or the user's computer, depending on the particular communication system embodiment being utilized, recognizes the calling party's telephone access code information and retrieves the appropriate access code for the called party. For example, if a called party is located in London and the calling party is calling long distance from within England, different access codes would be required to place this call than would be required to place the call to London from a caller in, for example, France. The calling party in France would require international codes and country codes to complete the call whereas the caller from within England would require appropriate long distance indicators utilized within England.

The caller's location, and thus the access codes for the caller's location, can be determined by the telephone connection mechanism by a variety of means. For example, the caller could be required to enter their phone number plus geographic location into the connection service page when placing a call to a called party or the calling party could register their phone number and geographic location into the telephone connection mechanism and database when initially subscribing to this particular service. Regardless of the way that the caller's access codes are input into the telephone connection mechanism, the invention retrieves the appropriate access code for the called party based on the calling party's telephone access code information.

Whereas the invention is disclosed as providing for assisting in the placement of out-of-area phone calls, the invention is not precluded from placing local phone calls as well. If the telephone connection mechanism determines that the calling party's access codes are the same as the called party's access codes, the telephone connection mechanism would transmit a telephone call connection request by using the appropriate phone number for the called party. For example, if the access codes are not required to place the call because the access codes for the calling party and the called party are the same, the invention would either delete the access codes from, or not add the access codes to, as appropriate, the called party's phone number when transmitting the connection request. However, if the access codes were still required even when the codes of the caller and calling party were the same, e.g. in Maryland where area codes are required in placing all calls, the invention would utilize the access codes when transmitting the connection request. Therefore, given any calling and called numbers plus access code information for both, the system is able to determine the correct number to dial.

Variations on the disclosed embodiments and additional features for the invention are contemplated. Database 250 is also capable of storing the complete telephone number of the called party for future reference after the caller inputs the local number of the called party and the access codes are retrieved. Once stored, in order to retrieve and utilize the stored complete telephone number of the called party, the connection service page could be provided with an input field where, for example, the name of the called party could be entered into the called party identifier field 620. The called party's complete telephone number could be retrieved from the database and entered into the called party out-of-area dialing number field 630 and utilized for sending a telephone call connection request by the telephone connection mechanism.

The invention is capable of providing access codes for multiple phone numbers, e.g. a list of phone numbers, input into the telephone connection mechanism. In this manner, the invention could be used to automate calling of numerous phone numbers. The same listing of numbers could be input into the telephone connection mechanism by different calling parties, located in different geographic locations, and the invention would provide the appropriate access codes for the phone numbers to each calling party, based on the geographic location of each calling party. The calling party could either enter the called party identifier information, e.g. the geographic location information, for each number in the list, as described previously in this specification, so that the invention could determine the access code for the called party or the called party phone numbers could be provided with geographic identifiers that would automatically enable the invention to retrieve the access code for each phone number from the database based on this embedded geographic identifier information in the phone number. Embedding geographic identifier information in the called party's phone number would alleviate the requirement for the calling party to input a called party identifier for each called party in order to determine the proper access code for each called party. The invention would determine the calling party's access codes as described previously in this specification. This application would be useful in a telemarketing context where the same listing of phone numbers is to be called by different caller's in different geographic locations.

Additionally, the database is not required to be resident in the telephone connection mechanism. It is only required that the telephone connection mechanism be able to access data from the database.

As described above, an apparatus and method is provided for allowing a caller to easily place a phone call to an out-of-area called party. The disclosed embodiments are illustrative of the different systems in which the present invention may be practiced. Other embodiments can be implemented by those skilled in the art without departing from the spirit and scope of the present invention.

What is claimed is:

1. A method for determining a called party's phone number when dialing out of a caller's local area comprising the steps of:
   storing out-of-area access codes in a database resident in a telephone connection mechanism;
   receiving the called party's local telephone number in said telephone connection mechanism, said local telephone number not including any prefix designating either an area code or an international calling code; and
   accessing from said database, by receiving a designation by the caller of a name of a geographic location related to the called party in said telephone connection mechanism, an out-of-area access code related to the called party's local telephone number, said out-of-area access code designating an area code or an international calling code for the called party's telephone.

2. The method of claim 1 wherein said telephone connection mechanism is a telephone network.

3. The method of claim 1 wherein said called party's local telephone number is received in said telephone connection mechanism as an input from a telephone keypad.

4. The method of claim 1 wherein said called party's local telephone number is received in said telephone connection mechanism as an oral response from the caller to a voice response unit utilizing speech recognition software.

5. The method of claim 1 further comprising the step of transmitting a telephone call connection request by said telephone connection mechanism by utilizing said called party's local telephone number and said accessed out-of-area access code.

6. The method of claim 1 wherein said step of accessing from said database, by receiving a designation by the caller of a name of a geographic location related to the called party in said telephone connection mechanism, an out-of-area access code related to the called party's local telephone number, includes the step of receiving a selection by the caller of a geographic area displayed on a graphical display.

7. The method of claim 6 wherein said graphical display is a map.

8. The method of claim 1 further comprising the step of automatically combining said called party s local telephone number with said accessed out-of-area access code by said telephone connection mechanism.

9. The method of claim 1 wherein said telephone connection mechanism is a data network.

10. The method of claim 1 wherein said called party's local telephone number is received in said telephone connection mechanism as an input from a computer input device.

11. The method of claim 10 wherein said computer input device is a keyboard.

12. The method of claim 1 wherein said designation by the caller of a name of a geographic location related to the called party is received in said telephone connection mechanism as an input from a computer input device.

13. The method of claim 12 wherein said computer input device is a mouse.

14. The method of claim 12 wherein said computer input device is a keyboard.

15. The method of claim 1 wherein said designation by the caller of a name of a geographic location related to the called party is received in said telephone connection mechanism as an oral response from the caller to a voice response unit utilizing speech recognition software.

16. The method claim 1 wherein said designation by the caller of a name of a geographic location related to the called party is received in said telephone connection mechanism as an input from a telephone keypad.

17. The method of claim 16 wherein said designation by the caller of a name of a geographic location related to the called party is received in said telephone connection mechanism as an input from a telephone keypad in response to a voice response unit prompt from said telephone connection mechanism.

18. An apparatus for determining a called party's phone number when dialing out of a caller's local area comprising:
   a network;
   a database resident in said network, wherein said database includes access codes, one of said access codes being utilized to place a call to a called party's telephone when dialing out of the caller's local area, said one of said access codes designating an area code or an international calling code for the called party's telephone; and
   a user input device wherein the caller utilizes said user input device to input the called party's local telephone number into said network and to designate a name of a geographic location related to the called party to said network, said local telephone number not including any prefix designating either an area code or an international calling code, and wherein said one of said access codes is accessed from said database based on said name of said geographic location related to the called party designated by the caller.

19. The apparatus of claim 18 wherein said network automatically combines said called party's local telephone number input by the caller and said accessed access code from said database and wherein said network transmits a telephone call connection request by utilizing said combined local telephone number and said accessed access code.

20. The apparatus of claim 18 wherein said user input device is a computer.

21. The apparatus of claim 18 wherein said user input device is a telephone.

22. The apparatus of claim 18 wherein said network is a data network.

23. The apparatus of claim 18 wherein said network is a telephone network.

24. A method for determining a called party's phone number when dialing out of a caller's local area comprising the steps of:
   storing out-of-area access codes in a database resident in a telephone connection mechanism;
   receiving the called party's local telephone number, said local telephone number not including any prefix designating either an area code or an international calling code, in said telephone connection mechanism; and
   accessing from said database an out-of-area access code related to the called party's local telephone number, said out-of-area access code designating an area code or an international calling code for the called party's telephone, wherein said step of accessing an access code from said database is accomplished by receiving identification information related to the called party from the caller and wherein said identification information is the name of the called party.

25. The method of claim 24 further comprising the step of transmitting a telephone call connection request by said telephone connection mechanism by utilizing said called party's local telephone number and said accessed out-of-area access code.

26. The method of claim 24 further comprising the step of automatically combining said called party's local telephone number with said accessed out-of-area access code by said telephone connection mechanism.

27. An apparatus for placing a phone call when dialing out of a caller's local area comprising:
   a network;
   a database resident in said network, wherein said database includes access codes, one of said access codes being utilized to place a call to a called party's telephone when dialing out of the caller's local area, said one of said access codes designating an area code or an international calling code for the called party's telephone; and
   a user input device wherein the caller utilizes said user input device to input the called party's local telephone number into said network, said local telephone number not including any prefix designating either an area code or an international calling code, and to input identification information related to the called party into said network, wherein said identification information is the name of the called party and wherein said one of said access codes is accessed from said database based on said identification information related to the called party input by the caller.

28. The apparatus of claim 27 wherein said network automatically combines said called party's local telephone number input by the caller and said accessed access code and wherein said network transmits a telephone call connection request by utilizing said combined local telephone number and said accessed access code.

29. The apparatus of claim 27 wherein said user input device is a computer.

30. The apparatus of claim 27 wherein said user input device is a telephone.

31. The apparatus of claim 27 wherein said network is a data network.

32. The apparatus of claim 27 wherein said network is a telephone network.

* * * * *